(No Model.)
C. E. EBERLE.
DRILL CHUCK.
No. 457,889. Patented Aug. 18, 1891.
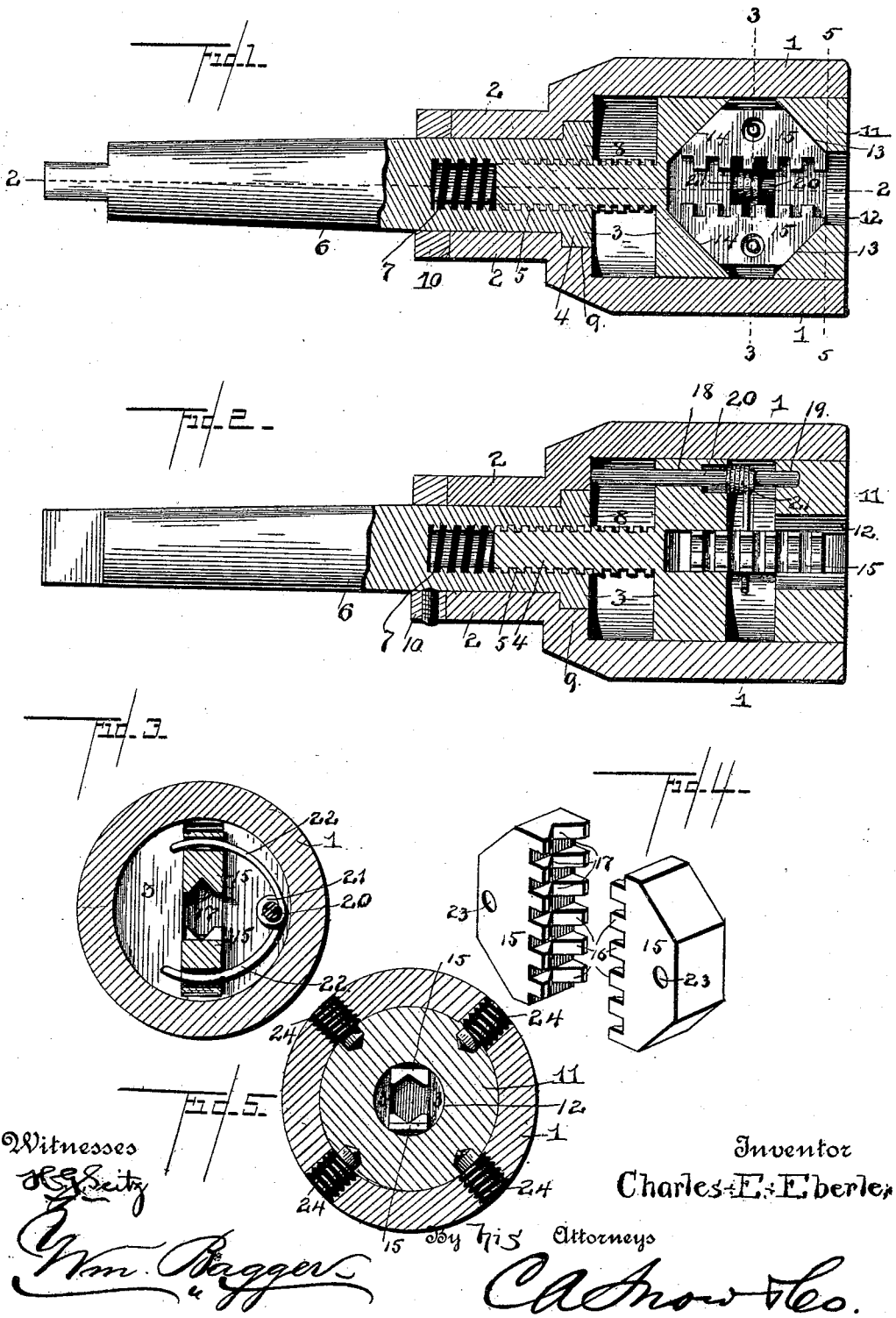
Witnesses
Inventor
Charles E. Eberle,
By his Attorneys

UNITED STATES PATENT OFFICE.

CHARLES EDWARD EBERLE, OF COLUMBUS, OHIO.

DRILL-CHUCK.

SPECIFICATION forming part of Letters Patent No. 457,889, dated August 18, 1891.

Application filed May 19, 1891. Serial No. 393,309. (No model.)

*To all whom it may concern:*

Be it known that I, CHARLES EDWARD EBERLE, a citizen of the United States, residing at Columbus, in the county of Franklin and State of Ohio, have invented a new and useful Drill-Chuck, of which the following is a specification.

This invention relates to drill-chucks; and it has for its object to provide a device of this class which shall possess superior advantages in point of simplicity, durability, and general efficiency.

With these ends in view the invention consists in the improved construction, arrangement, and combination of parts, which will be hereinafter fully described, and particularly pointed out in the claims.

In the drawings hereto annexed, Figure 1 is a longitudinal sectional view of a drill-chuck constructed in accordance with my invention. Fig. 2 is a sectional view taken on the line 2 2 of Fig. 1. Fig. 3 is a sectional view taken on the line 3 3 of Fig. 1. Fig. 4 is a detail view showing the clamping-jaws. Fig. 5 is a section on the line 5 5 of Fig. 1.

Like numerals of reference indicate like parts in all the figures.

1 designates a cylindrical socket provided with a wrench-seat 2.

3 designates a follower, consisting of a circular disk, mounted slidingly in the socket 1 and having a screw-threaded stem 4 extending through a perforation 5 in the bottom of the socket.

6 is a handle having a screw-threaded recess 7 to receive the projecting end of the stem 4. Said handle extends through the perforation 5 in the bottom of the socket, and has at its inner end a flange 8, for the accommodation of which a recess 9 is provided in the bottom of the socket 1. A collar 10 is mounted detachably upon the said handle outside of the socket to retain the said handle in position in such a manner as to permit it to revolve freely. In the outer end of the socket is secured a disk 11, having a central perforation 12 for the passage of the drill, which is to be mounted in the chuck.

The opposing faces of the disk or follower 3 and the stationary disk 11 are provided with transverse recesses 13 and 14, having beveled ends to receive the clamping-jaws 15, the ends of which are likewise beveled to fit the said recesses. Said clamping-jaws are provided upon their meeting faces with teeth or projections 16, adapted to mesh with each other and having V-shaped notches 17, adapted to grasp the shank of a drill, which is introduced between said jaws.

The disks 3 and 11 are provided with sockets 18 and 19 to receive a rod 20, which extends through a perforation in the disk 3 at the bottom of the socket 18. The said socket 18 is made large enough to accommodate a spring 21, which is coiled upon the rod 20 and which is provided with arms 22, extending through perforations 23 in the jaws 15, which are thereby forced apart from each other against the beveled end walls of the recesses 13 and 14, in which they are seated. The disk 11 is held securely in position by means of set-screws 24, which, however, will enable it to be readily detached in case it shall be found necessary to make any repairs to the chuck.

The operation of this invention will be readily understood from the foregoing description, taken in connection with the drawings hereto annexed. When it shall be desired to place a drill in the chuck, the socket of the latter is rotated upon the handle 6 until the disk or follower 3 has been drawn into the socket a sufficient distance to cause the jaws 15 to be spread by the action of the expanding spring 21 a sufficient distance to enable the shank of the drill to be inserted between the said clamping-jaws. The handle is mounted in a lathe, and a wrench is then applied to the seat 2 of the chuck-socket, which is now rotated in the opposite direction, thus forcing the disk or follower 3 in an outward direction and causing the clamping-jaws 15 to be forced in the direction of each by the beveled end walls of the recesses 13 and 14 engaging the beveled ends of the said clamping-jaws. The toothed faces of the latter will bite firmly against the shank of the drill or other tool, which is inserted between them, and it will be observed that the said jaws are mounted yieldingly, so as to adapt themselves to the shape of a shank, which may be introduced between them.

Having thus described my invention, I claim and desire to secure by Letters Patent of the United States—

1. In a drill-chuck, the combination of the chuck-socket having the disk secured at its other end, the interior sliding disk or follower, said stationary disk and follower being provided in their opposing faces with recesses having beveled end walls, the clamping-jaws seated in said recesses and having beveled ends and toothed meeting faces, a spring arranged to force the said clamping-jaws apart from each other, and mechanism for operating the sliding disk or follower, substantially as set forth.

2. In a drill-chuck having the stationary end disk and the sliding disk or follower provided in their opposing faces with recesses having beveled end walls, the herein-described clamping-jaws provided on their meeting faces with teeth meshing with each other and having V-shaped notches, substantially as and for the purpose set forth.

3. The combination of the chuck-socket having the wrench-seat and a perforation at its inner end, the handle extending through said perforation and having a flange at its inner end and provided with a collar adjacent to the outside of the socket, the sliding disk or follower having a screw-threaded stem engaging a screw-threaded recess in the handle, the perforated disk mounted in the outer end of the chuck-socket, the clamps having their ends mounted in recesses in the opposing faces of the said disks, said recesses being provided with beveled end walls to engage the beveled ends of the clamps, and a spring arranged to force the latter apart from each other, substantially as set forth.

4. In a drill-chuck, the combination of the socket, the sliding disk or follower, the stationary disk at the outer end of the socket, said disks being provided in their opposing faces with recesses having beveled end walls, the clamps seated in said recesses and having beveled ends engaging the beveled end walls of the latter, a rod mounted in recesses in the said disks and extending through a perforation in the sliding disk or follower, and a spring coiled upon said rod seated in a socket in the sliding disk or follower and having arms extending through transverse perforations in the clamping-jaws, which are thereby forced apart from each other, substantially as and for the purpose set forth.

5. In a drill-chuck having the stationary end disk and the sliding disk or follower, the herein-described clamping-jaws carried by the disk or follower, provided on their meeting faces with teeth meshing with each other and having V-shaped notches, substantially as and for the purpose set forth.

In testimony that I claim the foregoing as my own I have hereto affixed my signature in presence of two witnesses.

CHARLES EDWARD EBERLE.

Witnesses:
H. S. DAVIS,
AGNES H. EBERLE.